(12) United States Patent
Nada et al.

(10) Patent No.: US 10,102,416 B2
(45) Date of Patent: Oct. 16, 2018

(54) BIOMETRIC AUTHENTICATION DEVICE, BIOMETRIC AUTHENTICATION METHOD AND COMPUTER-READABLE NON-TRANSITORY MEDIUM

(71) Applicant: FUJITSU LIMITED, Kawasaki-shi, Kanagawa (JP)

(72) Inventors: Hajime Nada, Kawasaki (JP); Soichi Hama, Atsugi (JP); Satoshi Maeda, Atsugi (JP); Satoshi Semba, Kawasaki (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/401,175

(22) Filed: Jan. 9, 2017

(65) Prior Publication Data

US 2017/0200042 A1 Jul. 13, 2017

(30) Foreign Application Priority Data

Jan. 13, 2016 (JP) ................................ 2016-004580

(51) Int. Cl.
*G06K 9/00* (2006.01)
*G06K 9/46* (2006.01)
(Continued)

(52) U.S. Cl.
CPC ..... *G06K 9/00087* (2013.01); *G06K 9/00067* (2013.01); *G06K 9/00926* (2013.01);
(Continued)

(58) Field of Classification Search
CPC ..... G06K 9/00067; G06K 2009/00932; G06K 9/00013; G06K 9/00087
(Continued)

(56) References Cited

U.S. PATENT DOCUMENTS 6,324,297 B1 * 11/2001 Uchida ............. G06K 9/00067
 382/125
6,929,180 B2 * 8/2005 Tsukamoto ........ G06K 9/00006
 235/382
(Continued)

FOREIGN PATENT DOCUMENTS

CN 102073843 A 5/2011
CN 104123537 A 10/2014
(Continued)

OTHER PUBLICATIONS

Shoichiro Aoyama et al., "A Contactless Palmprint Authentication Algorithm for Mobile Phones", The Institute of Electronics, Information and Communication Engineers (May 2013), vol. J96-A, No. 5, pp. 250-263 (14 pages).
(Continued)

*Primary Examiner* — Yosef Kassa
(74) *Attorney, Agent, or Firm* — Fujitsu Patent Center

(57) ABSTRACT

A biometric authentication device includes: a memory; and a processor coupled to the memory and the processor configured to execute a process, the process comprising: extracting a finger crotch from a palm image for comparison; extracting a finger root wrinkle from the palm image for comparison; adjusting at least one of a position of a biometric feature for comparison of the palm image for comparison and a position of an enrollment biometric feature of an enrolled palm image, based on position information of the finger crotch extracted in the extracting of the finger crotch and position information of the wrinkle extracted in the extracting of the finger root wrinkle; and comparing the biometric feature for comparison and the enrollment biometric feature after the adjusting.

12 Claims, 17 Drawing Sheets

(51) Int. Cl.
*G06K 9/48* (2006.01)
*G06T 3/60* (2006.01)

(52) U.S. Cl.
CPC ......... *G06K 9/4604* (2013.01); *G06K 9/4609* (2013.01); *G06K 9/48* (2013.01); *G06T 3/60* (2013.01)

(58) Field of Classification Search
USPC ............... 382/115, 116, 124, 209, 278, 282; 340/5.81, 5.82, 5.83
See application file for complete search history.

(56) References Cited

U.S. PATENT DOCUMENTS

| | | | | |
|---|---|---|---|---|
| 6,970,584 | B2* | 11/2005 | O'Gorman | A61B 5/1172 340/5.83 |
| 7,327,858 | B2* | 2/2008 | Weiss | G06F 21/32 235/454 |
| 8,064,645 | B1 | 11/2011 | Sezille | |
| 8,224,064 | B1* | 7/2012 | Hassebrook | G01B 11/2513 382/154 |
| 8,295,560 | B2* | 10/2012 | Abiko | G06K 9/00026 382/115 |
| 8,854,523 | B2* | 10/2014 | Fukuda | G03B 15/00 348/333.01 |
| 8,942,439 | B2* | 1/2015 | Monden | G06K 9/0008 340/5.53 |
| 2010/0080422 | A1 | 4/2010 | Sato | |

FOREIGN PATENT DOCUMENTS

| | | |
|---|---|---|
| JP | 2000-194828 | 7/2000 |
| JP | 2007-052534 | 3/2007 |
| JP | 2010-086241 | 4/2010 |
| JP | 2013-246527 | 12/2013 |
| JP | 2014-174707 | 9/2014 |
| WO | 2013161077 A1 | 10/2013 |

OTHER PUBLICATIONS

Shoichiro Aoyama et al., "A Contactless Palmprint Authentication Algorithm for Mobile Phones", The Institute of Electronics, Information and Communication Engineers (May 2013), vol. J96-A, No. 5, pp. 250-263 (15 pages).

Connie, Tee et al.,"An automated palmprint recognition system", Image and Vision Computing, Elsevier, Guildford, vol. 23, No. 5, pp. 501-515, May 2005.

Extend European Search Report dated May 17, 2017 for corresponding European Patent Patent Application No. 17150782.5, 8 pages.

Michael, Goh Kah Ong et al.,"An innovative contactless palm print and knuckle print recognition system", Pattern Recognition Letters, Elsevier, Guildford, GB. vol. 31, No. 12, Sep. 1, 2010, pp. 1708-1719.

Michael, Goh Kah Ong et al.,"Touch-less palm print biometrics: Novel design and implementation", Image and Vision Computing, Elsevier, Guildford, GB, vol. 26, No. 12, Dec. 1, 2008, pp. 1551-1560.

European Office Action dated Jun. 19, 2018 for corresponding European Patent Application No. 17150782.5, 7 pages.

* cited by examiner

FIG. 12

|  |  | CROTCH STABILITY | |
|---|---|---|---|
|  |  | 1 | 0 |
| WRINKLE STABILITY | 1 | FINGER CROTCH AND FINGER ROOT WRINKLE | FINGER ROOT WRINKLE |
|  | 0 | FINGER CROTCH | NOT CALCULATED |

FIG. 13

| DOT NAME | X | Y | NEAREST INFORMATION |
|---|---|---|---|
| $P_1$ | 100 | 100 | FINGER ROOT WRINKLE 1 |
| $P_2$ | 101 | 100 | FINGER ROOT WRINKLE 1 |
| $P_3$ | 101 | 101 | FINGER ROOT CROTCH 1 |
| ⋮ | | | |
| $P_n$ | 600 | 110 | FINGER ROOT WRINKLE 3 |

| DOT NAME | X | Y | CORRESPONDING FINGER ROOT WRINKLE |
|---|---|---|---|
| $Q_1$ | 100 | 105 | FINGER ROOT WRINKLE 1 |
| $Q_2$ | 101 | 105 | FINGER ROOT WRINKLE 1 |
| ⋮ | | | |
| $Q_n$ | 600 | 115 | FINGER ROOT WRINKLE 3 |

FIG. 14

| ATTRIBUTE INFORMATION | | STRUCTURE OF PALM REGION | | PALM BIOMETRIC FEATURE |
|---|---|---|---|---|
| ID | USER NAME | DOTS OF QUADRATIC CURVE | DOTS OF FINGER ROOT WRINKLE | |
| 0001 | xxxx | $P^1$ | $Q^1$ | $H_1$ |
| 0002 | yyyy | $P^2$ | $Q^2$ | $H_2$ |
| ⋮ | | | | |
| 000n | zzzz | $P^n$ | $Q^n$ | $H_n$ |

BIOMETRIC AUTHENTICATION DEVICE, BIOMETRIC AUTHENTICATION METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2016-004580, filed on Jan. 13, 2016, the entire contents of which are incorporated herein by reference.

FIELD

A certain aspect of embodiments described herein relates to a biometric authentication device, a biometric authentication method and a computer-readable non-transitory medium.

BACKGROUND

There is used a technology in which outline information of a palm is used for adjusting a position of biometric information of the palm in a biometric authentication using a palm. For example, there is disclosed a technology in which a finger crotch that is a part of the outline information of a hand is used for a position adjustment (for example, see Japanese Patent Application Publication No. 2007-52534 and "A Contactless Palmprint Authentication Algorithm for Mobile Phones, Shoichiro Aoyama et al., The Institute of Electronics, Information and Communication Engineers, 2013/5 Vol. J96-A, No. 5, P. 250-263". And, there is disclosed a technology in which a position adjustment is performed with use of a finger joint wrinkle (see Japanese Patent Application Publication No. 2013-246527 and Japanese Patent Application Publication No. 2010-86241).

SUMMARY

According to an aspect of the present invention, there is provided a biometric authentication device including: a memory; and a processor coupled to the memory and the processor configured to execute a process, the process comprising: extracting a finger crotch from a palm image for comparison; extracting a finger root wrinkle from the palm image for comparison; adjusting at least one of a position of a biometric feature for comparison of the palm image for comparison and a position of an enrollment biometric feature of an enrolled palm image, based on position information of the finger crotch extracted in the extracting of the finger crotch and position information of the wrinkle extracted in the extracting of the finger root wrinkle; and comparing the biometric feature for comparison and the enrollment biometric feature after the adjusting.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 illustrates a calculation condition of a structure of a palm region;
FIG. 13 illustrates a data structure of a palm region;
FIG. 14 illustrates an enrollment data.

DESCRIPTION OF EMBODIMENTS

Figure 1A:
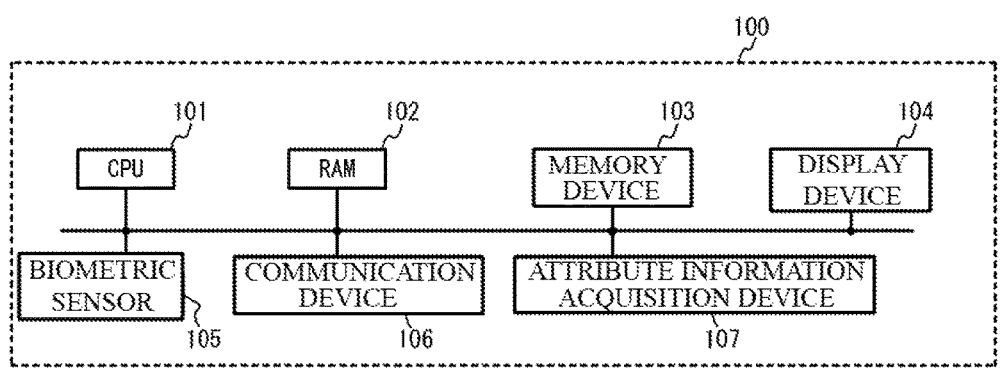
FIG. 1A illustrates a hardware structure of a biometric authentication device 100 in accordance with a first embodiment.
Figure 1B:
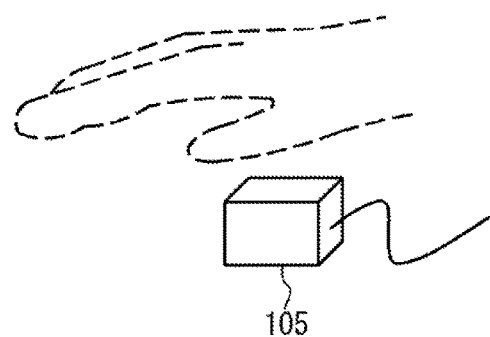
FIG. 1B illustrates schematic view of a biometric sensor.

The following is a description of embodiments, with reference to the accompanying drawings.
[First Embodiment]
FIG. 1A illustrates a hardware structure of a biometric authentication device 100 in accordance with a first embodiment. FIG. 1B illustrates schematic view of a biometric sensor 105 described later. As illustrated in FIG. 11, the biometric authentication device 100 has a CPU 101, a RAM (Random Access Memory) 102, a memory device 103, a display device 104, a biometric sensor 105, a communication device 106, an attribute information acquisition device 107 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric authentication program in accordance with the first embodiment. The display device 104 is a liquid crystal display, an electroluminescence panel, or the like, and shows a result of each process described later.

Figure 2A:
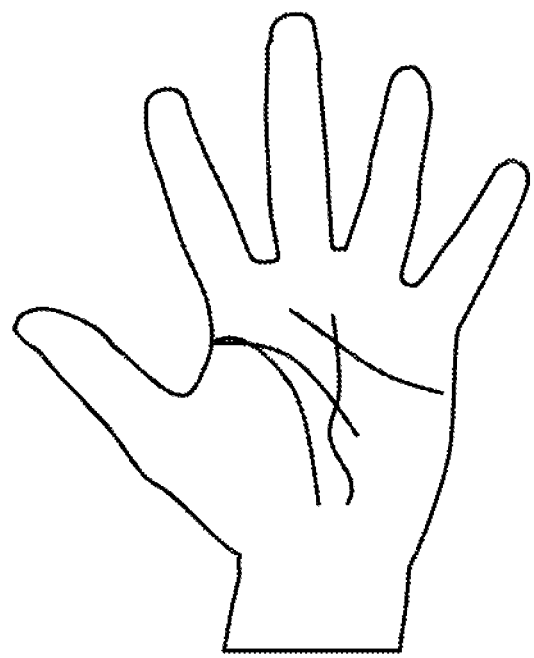
FIG. 2A illustrates a palm print.
Figure 2B:
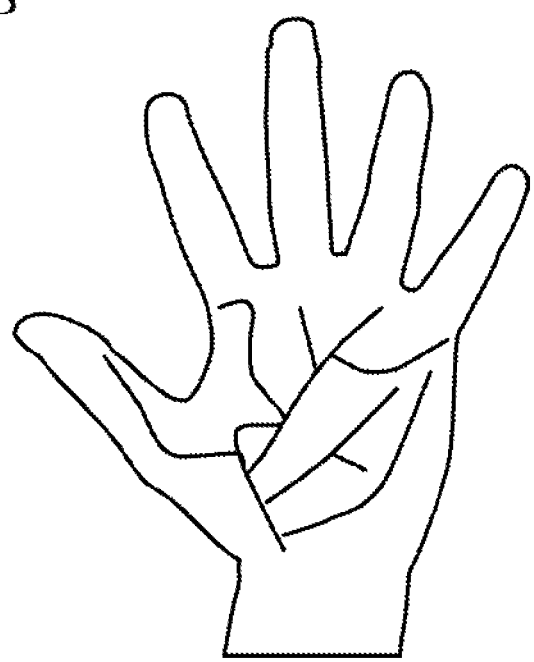
FIG. 2B illustrates a vein.

The biometric sensor 105 is a sensor for acquiring biometric information of a user. In the embodiment, the biometric sensor 105 acquires a palm image of a user without touching. As illustrated in FIG. 1B, the biometric sensor 105 is a CMOS (Complementary Metal Oxide Semiconductor) camera or the like. Based on information of a visible light, the biometric sensor 105 is capable of acquiring a palm print that is information of a wrinkle of a palm surface illustrated in FIG. 2A, as biometric information. Alternately, the biometric sensor 105 acquires a vein pattern illustrated in FIG. 2B, by using a near-infrared light. The biometric sensor 105 is capable of acquiring a palm shape such as a palm width, a finger length, a hand outline from a palm image. In the embodiment, a palm print is acquired as the biometric information. It is preferable that the palm image includes a whole of a palm including fingertips. However, the palm image may include only a range to a middle of a finger.

The communication device 106 is a connection interface with LAN (Local Area Network). The attribute information acquisition device 107 is an inputting device such as a keyboard or a mouse. For example, an ID for identifying a user, a user name, a password or the like is input to the attribute information acquisition device 107.

A biometric authentication program stored in the memory device 103 is developed to the RAM 102. The CPU 101 executes the biometric authentication program developed to the RAM 102. Thus, each process is executed by the biometric authentication device 100. When the biometric authentication program is executed, an enrollment process, an authentication process and so on are executed.

In the enrollment process, a biometric feature extracted from biometric information acquired by the biometric sensor 105 is related to each user and is enrolled in a database. In the embodiment, a palm print, a vein pattern, a palm shape or the like that are extracted from a palm image are enrolled in a database as a biometric feature. In the authentication process, when a similarity between a biometric feature for comparison acquired by the biometric sensor 105 and an enrolled biometric feature enrolled in the database is equal to or more than a threshold, it is determined that a user is the same as an enrolled user. In the embodiment, when a similarity between a palm print acquired in the authentication process and a palm print enrolled in the database is equal to or more than a threshold, it is determined that a user is the same as an enrolled user. Details of each process will be described later.

There may be a difference between a posture of a palm of a user with respect to the biometric sensor 105 in the enrollment process and a posture of the palm with respect to the biometric sensor 105 in the authentication process. And so, it is preferable that a position adjustment of a biometric feature of a palm is performed between a palm image acquired in the enrollment process and a palm image acquired in the authentication process in terms of suppression of authentication error.

Figure 3A:
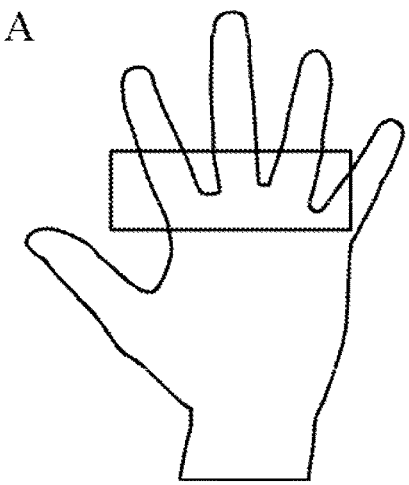
FIG. 3A to FIG. 3C illustrate a finger root feature.
Figure 3B:
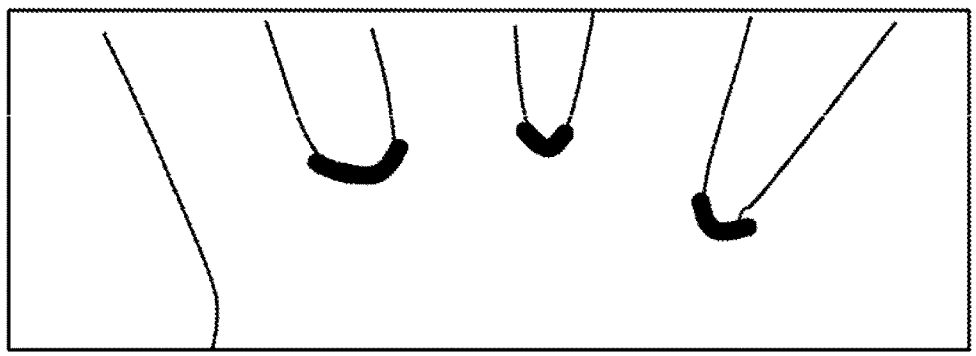
Figure 3C:
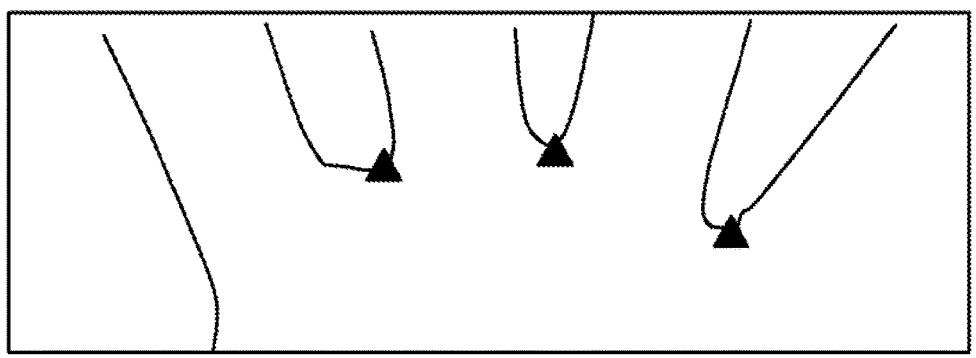

And so, many methods using information of a hand outline extracted from a palm image are being used. For example, it is thought that a feature of a finger root illustrated in FIG. 3A is used as the information of a hand outline. For example, as illustrated in FIG. 3B, a crotch corresponding to a concave portion between two adjacent fingers is detected. Next, as illustrated in FIG. 3C, when one point is selected from the crotch, it is possible to use the point as a key point in a position adjustment.

Figure 4A:
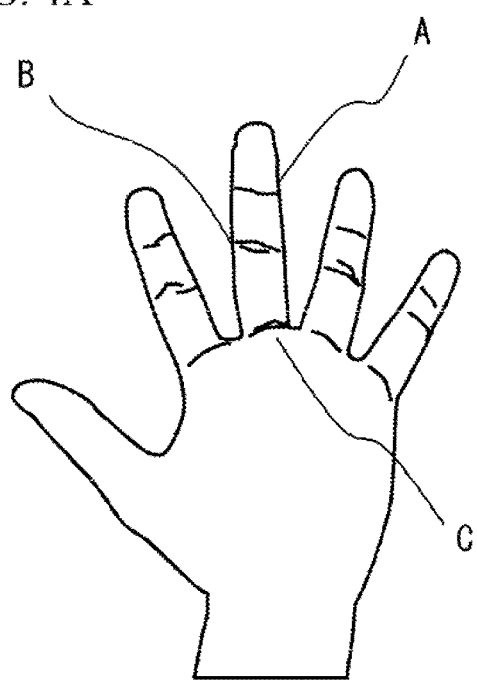
FIG. 4A illustrates a finger wrinkle.
Figure 4B:
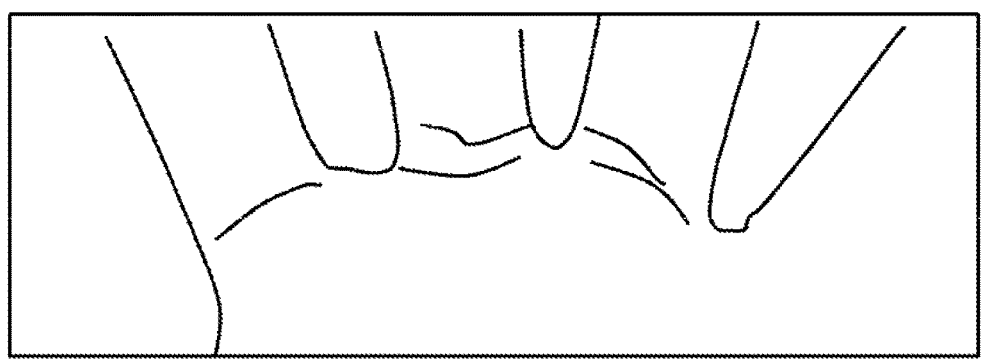
FIG. 4B illustrates an enlarged view of a finger root wrinkle.

Alternately, as illustrated in FIG. 4A, it is thought that a wrinkle of a finger joint is used for the position adjustment. In this description, wrinkles of finger joints are named a distal finger joint wrinkle A, a proximal finger joint wrinkle B and a finger root wrinkle C in order from a fingertip. FIG. 4B illustrates an enlarged view of the finger root wrinkle C. It is thought that based on these wrinkles, the position adjustment is performed with use of the wrinkles such as the distal finger joint wrinkle or the proximal finger joint wrinkle.

Figure 5A:
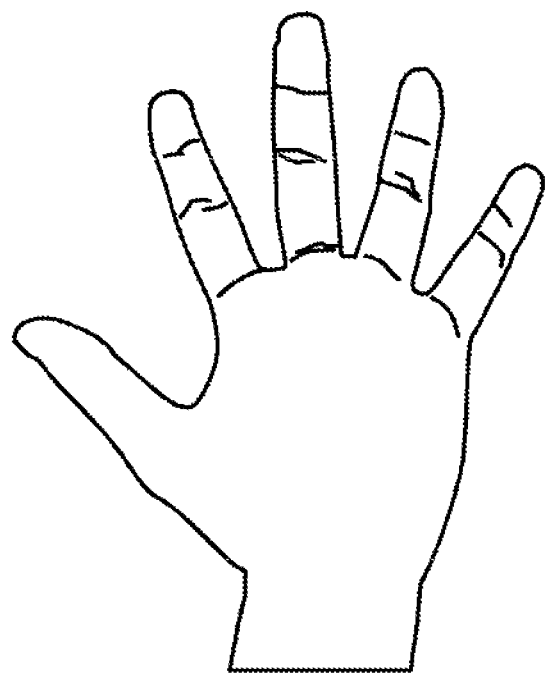
FIG. 5A and FIG. 5B illustrate an opening of a finger.
Figure 5B:
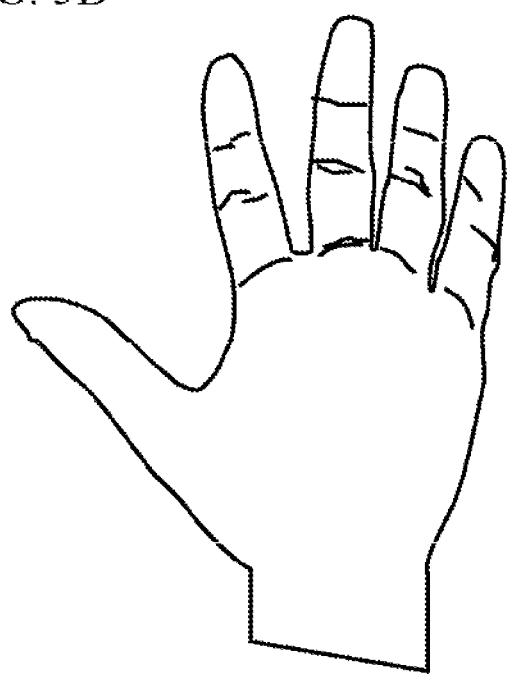

However, when a palm is floated in air and a palm image is captured without touching by the biometric sensor 105, a whole position of a hand is not fixed. Therefore, as illustrated in FIG. 5A and FIG. 5B, an opening angle or a closing angle of a finger may fluctuate. For example, an opening degree of a finger in FIG. 5A is larger than an opening degree of the finger of FIG. 5B.

When an opening and closing angle of a finger changes, a position of each information used for the position adjustment such as the key point or the finger joint wrinkle changes. Therefore, a position adjustment of a biometric feature of a palm may be unstable. For example, when a palm image is captured in a case where fingers are closed, an extraction of a key point of a finger crotch is unstable. Therefore, high accuracy is not achieved in a position adjustment using only a finger crotch. A position of a finger wrinkle fluctuates when a finger angle fluctuates. Therefore, high accuracy is not achieved in a position adjustment using only a finger wrinkle. And so, in the embodiment, a description will be given of a structure for improving authentication accuracy by improving a position adjustment accuracy.

Figure 6:
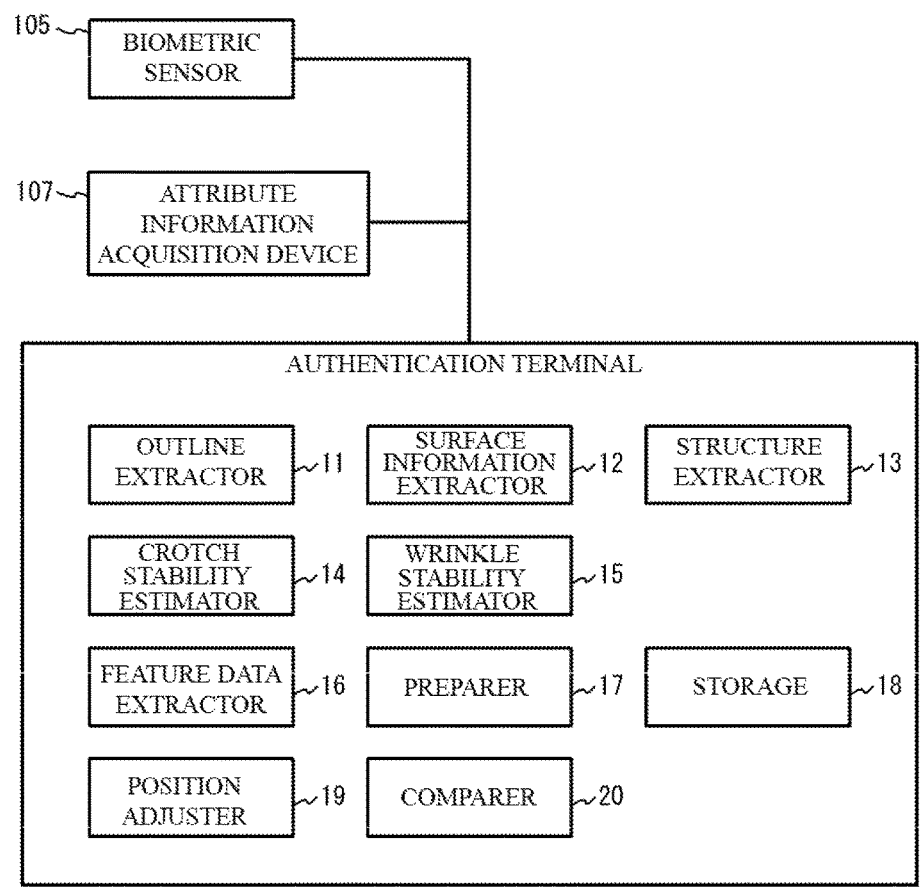
FIG. 6 illustrates a block diagram of each function achieved by execution of a biometric authentication program.

FIG. 6 illustrates a block diagram of each function achieved by execution of the biometric authentication program. By the execution of the biometric authentication program, an outline extractor 11, a surface information extractor 12, a structure extractor 13, a crotch stability estimator 14, a wrinkle stability estimator 15, a feature data extractor 16, a preparer 17, a storage 18, a position adjuster 19, a comparer 20 and so on are achieved. An example of FIG. 6 is structured with a stand-alone terminal. However, the structure is not limited. For example, the embodiment can be applied to a client server system. In the embodiment, a description will be given of the stand-alone terminal, for simplification.

Figure 7:
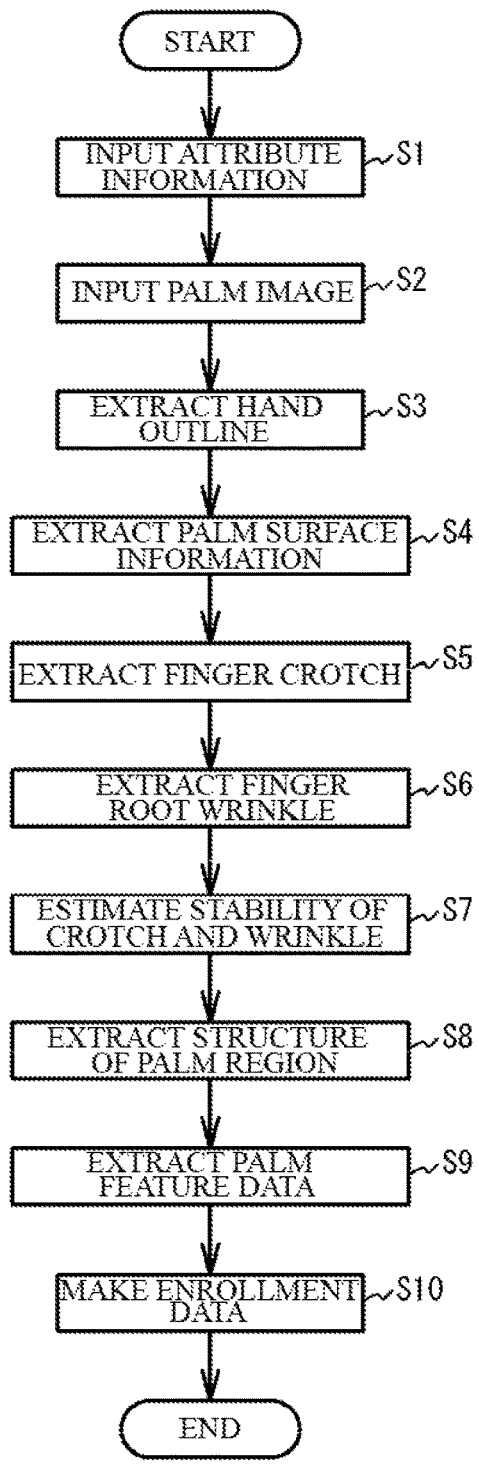
FIG. 7 illustrates an example of a flowchart of an enrollment process.

(Enrollment Process) FIG. 7 illustrates an example of a flowchart of processes executed by components of the biometric authentication device 100 in the enrollment process. A description will be given of the processes of the components based on the flowchart of FIG. 7. The attribute information acquisition device 107 acquires attribute information input by a user who is an object for enrollment (Step 51). Next, the biometric sensor 105 captures a palm image of the user (Step S2).

Next, the outline extractor 11 extracts a palm outline that is an interface line between a background and a hand region including fingers and a palm (Step S3). For example, the outline extractor 11 applies a binarization process to the palm image and separates the hand region from the background. The outline extractor 11 may extract a region in which a brightness value of the palm image is larger than a threshold as the hand region and may separate the other region as the background. After that, the outline extractor 11 extracts the interface line between the hand region and the background as the outline of the hand.

Next, the surface information extractor 12 extracts palm surface information that is a two dimensional class of dots of a region where wrinkles on the palm side exist, by applying an edge extraction process to the palm image (Step S4). The surface information extractor 12 extracts palm surface information by applying an edge extraction filter such as a Sobel filter to the palm image.

Figure 8A:
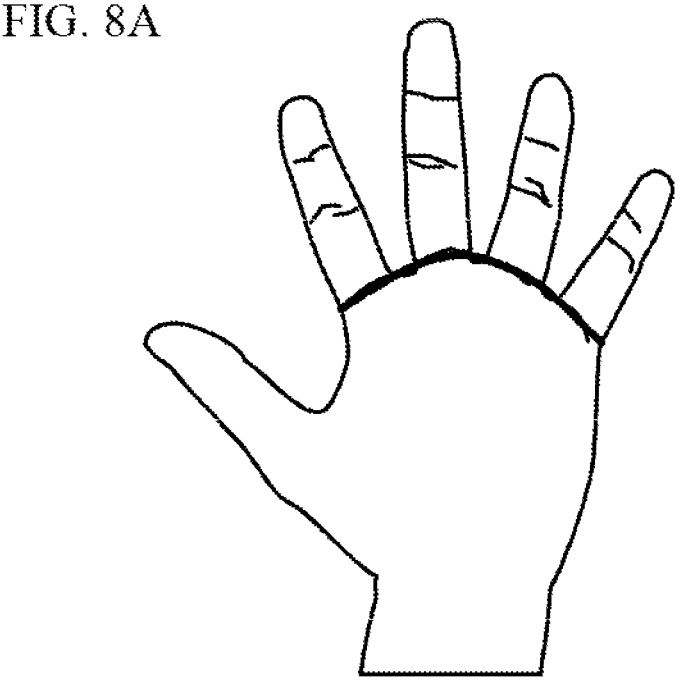
FIG. 8A and FIG. 8B illustrate a structure of a palm region.
Figure 8B:
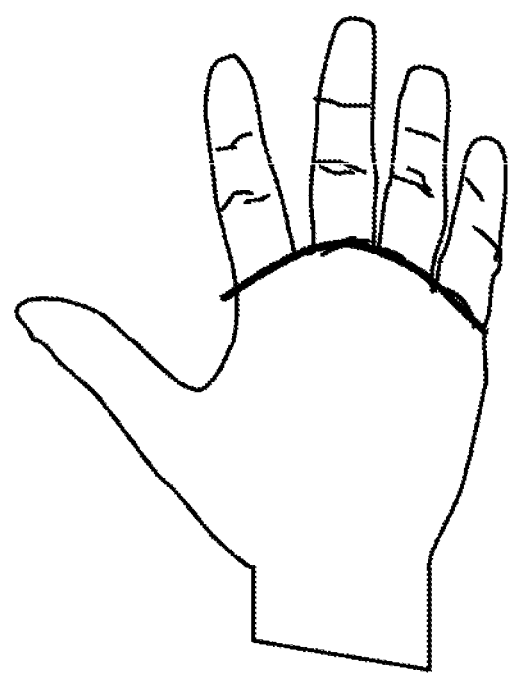

The structure extractor 13 extracts a structure of the palm region from the hand outline and the palm surface information. The structure of the palm region can be acquired from the finger crotch and the finger root wrinkle that are extracted from the palm image. As an example, the structure is an approximated line acquired from a finger crotch and a finger root wrinkle. The approximated line is a class of dots on a curve line such as a black thick line illustrated in FIG. 8A and FIG. 8B. The structure extractor 13 may extract the finger crotch and the finger root wrinkle from an arbitrary finger. The structure extractor 13 may extract finger crotches and finger root wrinkles from a plurality of areas. In the embodiment, the structure extractor 13 extracts three finger crotches and four finger roots from four fingers of an index finger, a middle finger, an annular finger and a pinky finger. After that, the structure extractor 13 approximates a class of all dots that are the finger crotches and the finger root wrinkles to curve lines.

The finger crotch is a two-dimensional class of dots indicating a film between two adjacent fingers as illustrated in FIG. 3B. As illustrated in FIG. 7, the structure extractor 13 calculates an asperity shape of the hand outline, extracts a key point of a part of the finger root crotch from the hand outline, and extracts a class of dots on the hand outline within a predetermined range of the key point (Step S5). The finger root wrinkle is an interface line between each finger and a palm and is a third joint from a fingertip. The structure extractor 13 extracts the finger root wrinkle from the palm surface information by calculating the asperity shape of the hand outline and a regularity of a class of dots of the palm surface information (Step S6).

Figure 9:
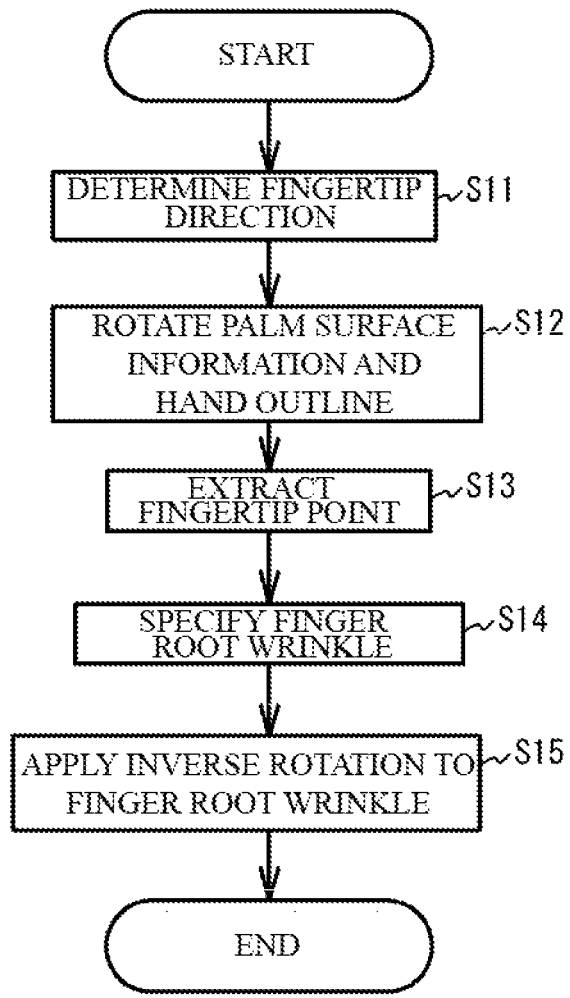
FIG. 9 illustrates an example of a flowchart executed in a case where a finger root wrinkle is extracted.
Figure 10A:
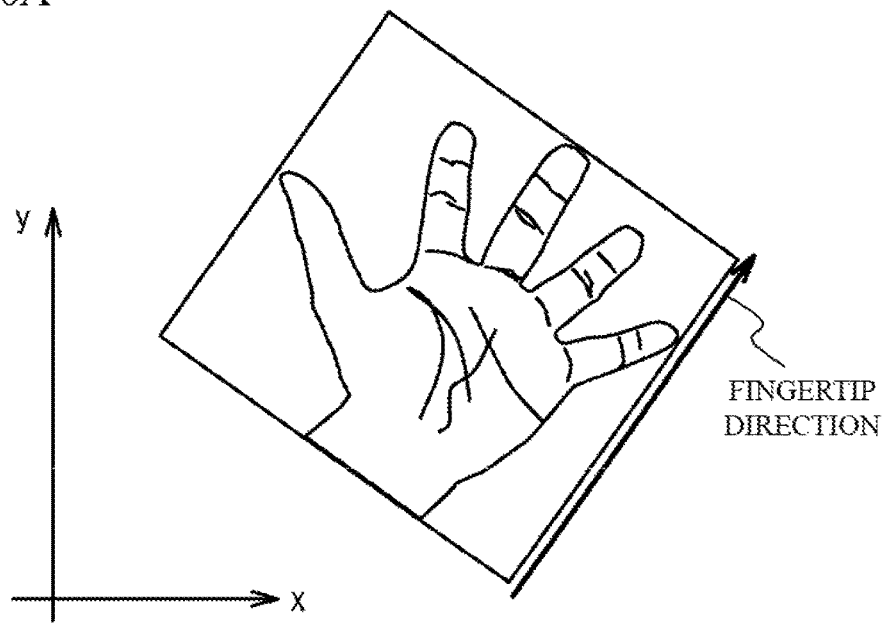
FIG. 10A and FIG. 10B illustrate a rotation of a hand region.
Figure 10B:
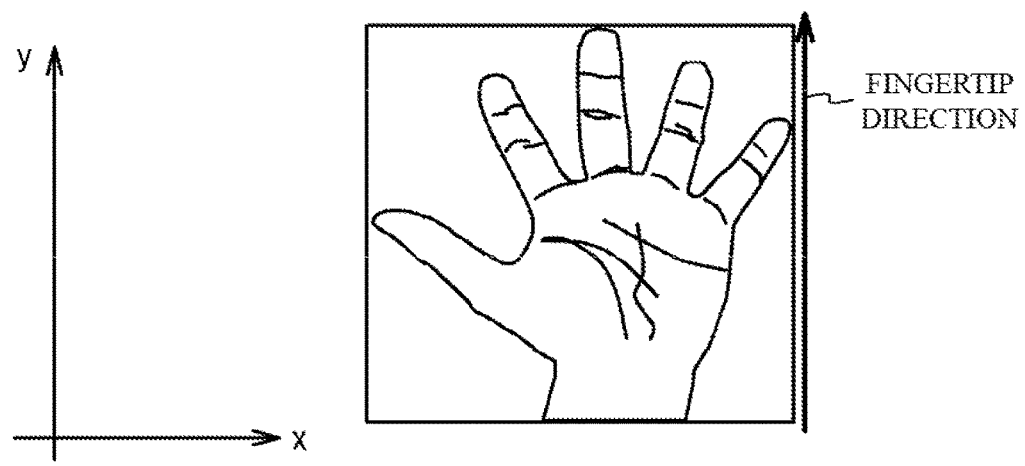
Figure 11A:
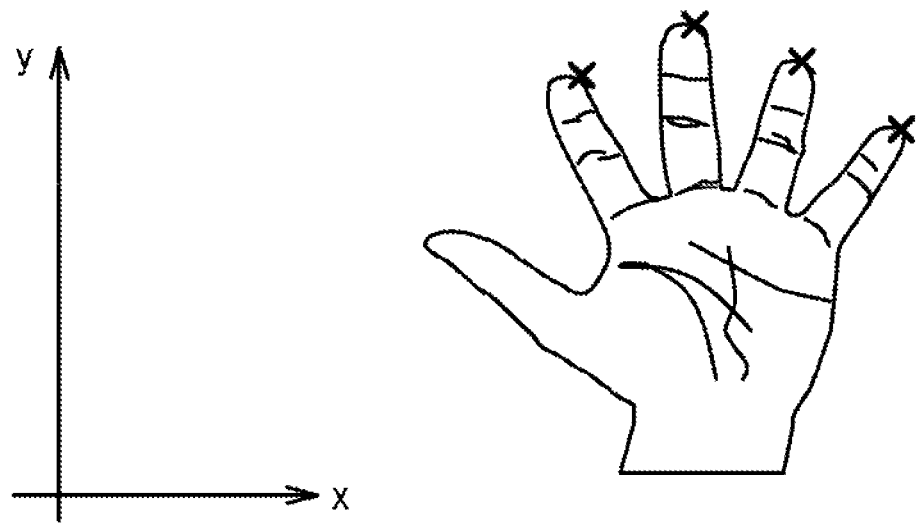
FIG. 11A illustrates a fingertip.
Figure 11B:
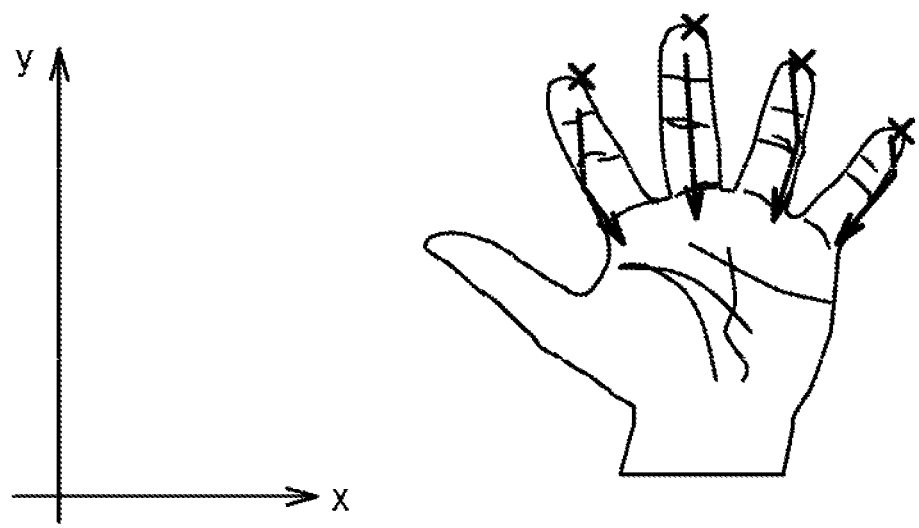
FIG. 11B illustrates a searching of a wrinkle.

FIG. 9 illustrates an example of a flowchart executed in a case where the structure extractor 13 extracts the finger root wrinkle. As illustrated in FIG. 9, the structure extractor 13 determines a direction of a fingertip (Step S11). The structure extractor 13 prepares a minimum rectangular including a hand region surrounded by the hand outline extracted by the outline extractor 11 as illustrated in FIG. 10A, and extracts a longitudinal direction of the rectangular as the direction of the fingertip. Next, the structure extractor 13 rotates the palm surface information and the hand outline around a gravity center of the rectangular so that the direction of the fingertip is in parallel with one of axes of two-dimensional coordinate where the hand outline exits (Step S12). The structure extractor 13 extracts a point of the fingertip from the rotated hand outline (Step S13). As illustrated in FIG. 11A, the structure extractor 13 extracts one point from each finger of which y-coordinate is local maximum.

As illustrated in FIG. 9, the structure extractor 13 performs searching from the fingertip toward a direction opposite to the fingertip and specifies a partial class of the palm surface information corresponding to the finger root wrinkle (Step S14). The structure extractor 13 performs the searching in an arrow direction illustrated in FIG. 11B. For example, the structure extractor 13 performs the searching in −y direction. When the searching line crosses the hand outline in the searching, the structure extractor 13 changes the searching direction along the hand outline. The structure extractor 13 counts the number of the partial classes of the palm surface information satisfying the regularity of joint wrinkles of each finger in the searching and extracts the partial class of the palm surface information corresponding to the third wrinkle from the fingertip as the finger root wrinkle.

The structure extractor 13 may form a curved line having a length of 1 cm to 4 cm corresponding to a finger width and may use a regularity of each finger joint wrinkle in which a class of dots within a predetermined range forms each wrinkle. Alternately, the structure extractor 13 may form a curved line having a direction vertical to the searching direction and may use a regularity of each finger joint wrinkle in which a class of dots within a predetermined range forms each wrinkle. The finger root wrinkle may be formed with two or more curved lines as illustrated in FIG. 3B.

When a whole palm including a fingertip is not captured, the structure extractor 13 uses a point at which a y-coordinate becomes a local maximum that is the closest to the fingertip in the capturing range, instead of the fingertip. Further, the structure extractor 13 calculates an average value of the y-coordinate of a partial class of a plurality of extracted palm surface information, and specifies the partial class of the palm surface information of which the average of the y-coordinates is a minimum, as a finger root wrinkle. After that, as illustrated in FIG. 9, the structure extractor 13 inversely rotates the finger root wrinkle by a rotation angle, and adjusts the coordinates of the wrinkle to the coordinates of the palm image before rotation (Step S15). With the processes, the structure extractor 13 extracts the finger root wrinkle.

Next, as illustrated in FIG. 7, the crotch stability estimator 14 and the wrinkle stability estimator 15 estimate stability of the finger root crotch and stability of the finger root wrinkle (Step S7). The crotch stability estimator 14 calculates the crotch stability (0 to 1) that is a determined result whether the finger crotch can be stably extracted. The crotch stability becomes 1 when it is determined that the finger crotch can be stably extracted. The crotch stability becomes 0 when it is determined that the finger crotch cannot be stably extracted. For example, the crotch stability estimator 14 calculates variability such as dispersion with respect to positions of all points of the finger crotch. When the variability becomes smaller, the crotch stability may get closer to 1. When the variability becomes larger, the crotch stability may get closer to 0. For example, a dispersion of fluctuation of fingertip direction of the all points of the finger crotch may be calculated as the variability.

Alternately, the crotch stability estimator 14 substitutes "1" into the crotch stability when all dots of the finger crotch exist in a predetermined range. The crotch stability estimator 14 substitutes "0" into the crotch stability when at least one dot of the finger crotch exists out of the predetermined range. Alternately, the crotch stability estimator 14 substitutes "1" into the crotch stability when a dispersion of fluctuation of fingertip directions of the finger crotch points is equal to or less than a predetermined value.

The wrinkle stability estimator 15 calculates the wrinkle stability (0 to 1) that is a determined result whether the finger root wrinkle can be stably extracted. The wrinkle stability becomes 1 when it is determined that the finger root wrinkle can be stably extracted. The wrinkle stability becomes 0 when it is determined that the finger root wrinkle cannot be stably extracted. For example, the wrinkle stability estimator 15 calculates variability such as dispersion with respect to positions of all points of the finger root wrinkle. When the variability becomes smaller, the wrinkle stability may get closer to 1. When the variability becomes larger, the wrinkle stability may get closer to 0. For example, a dispersion of fluctuation of fingertip direction of the all points of the finger root wrinkle may be calculated as the variability.

Alternately, the wrinkle stability estimator 15 substitutes "1" into the wrinkle stability when all dots of the finger root wrinkle exist in a predetermined range. The wrinkle stability estimator 15 substitutes "0" into the wrinkle stability when at least one dot of the finger root wrinkle exists out of the predetermined range. Alternately, the wrinkle stability estimator 15 substitutes "1" into the wrinkle stability when a dispersion of fluctuation of fingertip directions of the finger root wrinkle points is equal to or less than a predetermined value.

Next, the structure extractor 13 calculates the structure of the palm region from the finger crotch and the finger root (Step S8). For example, the structure extractor 13 approximates coordinates of the finger crotch and the finger root wrinkle to a quadratic curve by using a least square method and calculates dots of the quadratic curve as the structure of the palm region. The structure extractor 13 may use the crotch stability or the wrinkle stability and may determine information for calculating the structure of the palm region. For example, the structure extractor 13 may change the usage ratio between the finger crotch and the finger root wrinkle in accordance with the stability. For example, the structure extractor 13 may increase a weight with respect to the stability having a large value and may reduce the weight with respect to the value having a small stability.

Alternately, the structure extractor 13 may determine information to be calculated, in accordance with conditions of FIG. 12. When the crotch stability is 1 and the wrinkle stability is 1, the opening and closing angle of fingers is stable. It is therefore possible to stably extract the finger crotch and the finger root wrinkle. Thus, the structure extractor 13 may calculate the structure of the palm region with use of the finger crotch and the finger root wrinkle. When the crotch stability is 1 and the wrinkle stability is 0, the opening angle of fingers is large the finger root wrinkle is unstable. However, the finger crotch can be stably extracted. In this case, the structure extractor 13 may calculate the structure of the palm region with use of only dots of the finger crotch. When the crotch stability is 0 and the wrinkle stability is 1, fingers are closed and the finger crotch is unstable. However, the finger root wrinkle can be stably extracted. In this case, the structure extractor 13 may calculate the structure of the palm region with use of only dots of the finger root wrinkle. When the crotch stability is 0 and the wrinkle stability is 0, the palm image is input with an unexpected posture and neither the finger crotch nor the finger root wrinkle can be stably extracted. In this case, the structure extractor 13 determines that the structure of the palm region cannot be extracted and stops the processes. And the biometric authentication device 100 may ask for a user to input a palm image again.

When the finger root wrinkle includes two or more curved lines, the structure extractor 13 may calculate the structure of the palm region with use of only a single curved line. For example, the structure extractor 13 may calculate the structure of the palm region with use of a curved line of the wrinkle of the root of the longest finger or a wrinkle of the finger root that is the closest to the palm region.

The structure extractor 13 may relate each dot of the structure of the palm region with the nearest finger root crotch or the nearest finger wrinkle and may store each dot as a part of the structure of the palm region. And, the structure extractor 13 may store not only the dots of the quadratic curve but also the finger root wrinkle as the structure of the palm region. In these cases, when the dots of the quadratic curve are expressed as $P=\{P1, \ldots, Pn\}$ and the dots of the finger root wrinkle are expressed as $Q=\{Q1, \ldots, Qm\}$, dots L of the structure of the palm region in which the dots of P and the dots of Q are added has a data structure illustrated in FIG. 13. The structure of the palm region illustrated in FIG. 8A and FIG. 8B extracted with the processes corresponds to the interface line between the palm and the finger and is approximately fixed curved line regardless of the opening and closing angle of the finger. Therefore, the structure of the palm region can be stably extracted.

Next, as illustrated in FIG. 7, the feature data extractor 16 extracts a biometric feature used for comparison, from the biometric information of the palm image (Step S9). For example, the biometric feature is a pattern of a palm print including a big wrinkle and a small wrinkle of the palm surface, frequency information of the palm print or the like, when a palm print is used as the biometric information. When a vein is used as the biometric information, the biometric feature is a vein pattern inside of a palm. When a palm shape is used as the biometric information, the biometric feature is a length of each part of the palm, a shape of the hand outline, or the like.

Next, the preparer 17 relates the attribute information acquired in Step 51 and the structure of the palm region with the biometric feature of the palm, and prepares an enrollment data (Step S10). The enrollment data is stored in the storage 18. The storage 18 stores a plurality of enrollment data having the structure illustrated in FIG. 14. With the processes, the enrollment process is finished.

Figure 15:
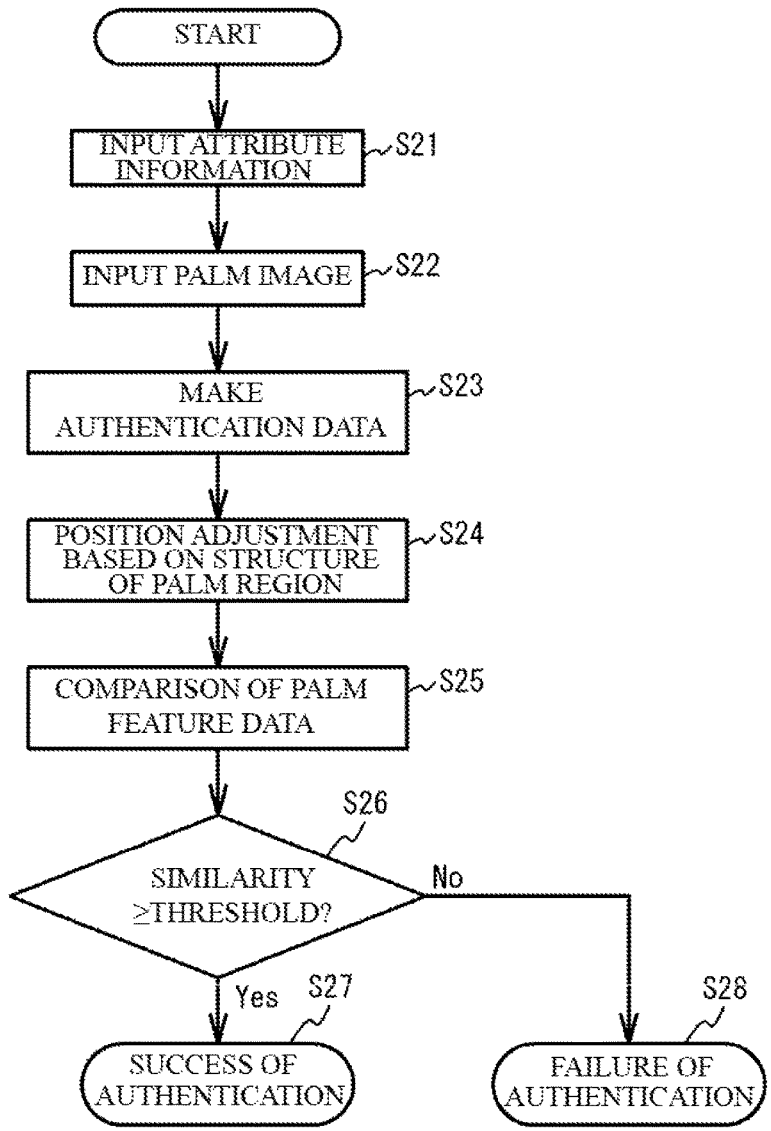
FIG. 15 illustrates an example of a flowchart of an authentication process.

(Authentication Process) FIG. 15 illustrates an example of a flowchart of the authentication process executed by each component of the biometric authentication device 100. A description will be given of the process of each component based on FIG. 15. The attribute information acquisition device 107 acquires attribute information input by a user who is an object of enrollment (Step S21). Next, the biometric sensor 105 captures a palm image of the user as an object for comparison (Step S22).

Next, the outline extractor 11, the surface information extractor 12, the structure extractor 13, the crotch stability estimator 14, the wrinkle stability estimator 15, the feature data extractor 16 and the preparer 17 prepare an authentication data (Step S23). The process of Step S23 is the same as Steps S3 to S10 of FIG. 7.

Figure 16:
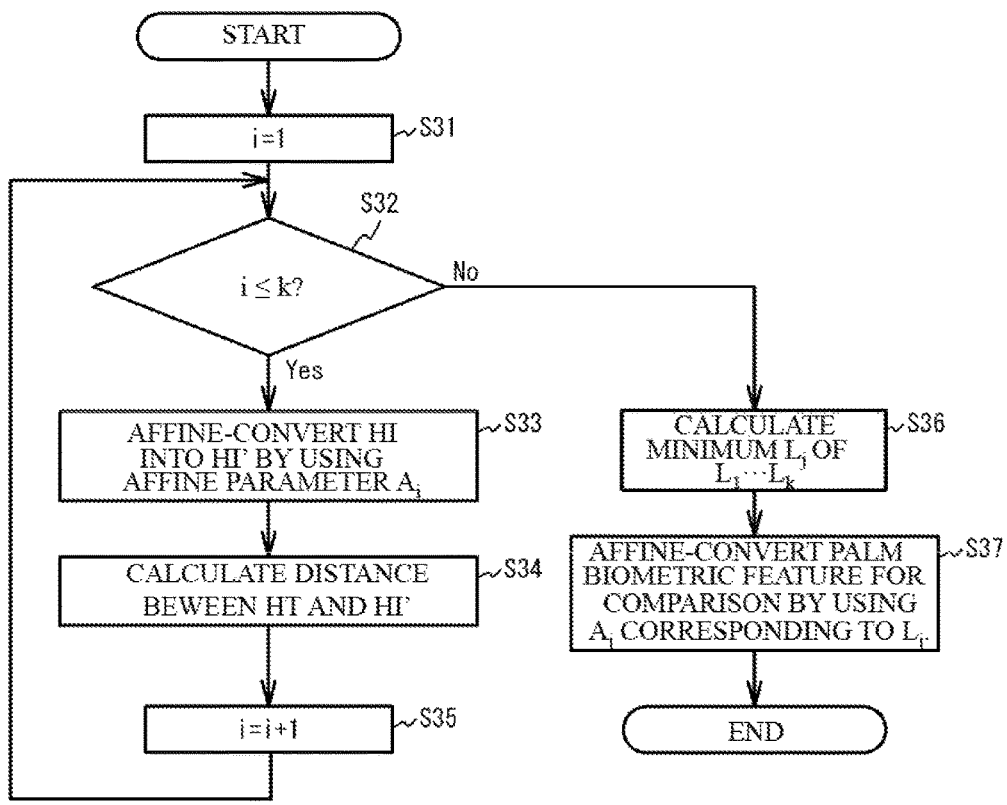
FIG. 16 illustrates a flowchart of a position adjustment.

Next, the position adjuster 19 calculates a position gap between the structure of the palm region of the enrollment data and the structure of the palm region for comparison, and adjusts at least one of the position of the biometric feature of the enrollment data and the position of the biometric feature for comparison so that the position gap is reduced (Step S24). The position adjuster 19 performs processes of a flowchart of FIG. 16. A description will be given of the flowchart of FIG. 16.

The position adjuster 19 substitutes "1" into an algebra "i" (Step S31). Next, the position adjuster 19 determines whether the algebra "i" is equal to or less than a predetermined number "k" (Step S32). When it is determined as "Yes" in Step S32, the position adjuster 19 uses an affine parameter Ai and makes HI' by affine-converting a structure HI of the palm region for comparison (Step S33).

Next, the position adjuster 19 calculates a distance between the structure HI' of the palm region after the affine conversion and a structure HT of the palm region of the enrollment data (Step S34). For example, the position adjuster 19 calculates a Euclidian distance between the whole of the structure HI' and the whole of the structure HT. Alternately, the position adjuster 19 may calculate the distance between a partial sequence of the HT and a partial sequence of the HI' that correspond to a position of a crotch of one or more fingers. The position adjuster 19 may calculate the distance between a pattern QT of one or more finger root of the structure of the palm region of the enrollment data and a pattern QI' in which a pattern of a wrinkle of one or more finger root of the structure of the palm region for comparison is affine converted.

Next, the position adjuster 19 adds "1" to the algebra "i" (Step S35). After that, Step S32 is executed again. When Steps S32 to S35 are repeatedly executed, the structure of the palm region for comparison is subjected to the affine conversion using affine parameters {A1, ..., Ak} of which number is different from each other, a predetermined "k" times.

When it is determined as "No" in Step S32, the position adjuster 19 calculates a minimum value Lj of the distances (Step S36). Next, the position adjuster 19 selects the affine parameter Aj corresponding to the minimum value Lj as the position gap, and applies the affine conversion to the biometric feature of the palm region for comparison with use of the position gap (Step S37). With the processes, the position adjustment is finished.

Next, as illustrated in FIG. 15, the comparer 20 compares the biometric feature of the enrollment data with the biometric feature for comparison in which the position is adjusted by the position adjuster 19, and calculate a similarity used for authentication determination (Step S25). When the biometric information of the palm is a palm print and the biometric feature of the palm is a pattern of the palm print, the comparer 20 calculates the similarity by performing a pattern matching of the biometric feature of the palm.

Next, the comparer 20 determines whether the calculated similarity is equal to or more than a threshold (Step S26). When it is determined as "Yes" in Step S26, the comparer 20 output a result of success of the authentication (Step S27). When it is determined as "No" in Step S26, the comparer 20 outputs a result failure of the authentication (Step S28).

In the embodiment, the position adjustment is performed between the biometric feature for comparison and the biometric feature of the enrollment data based on the position information of the finger crotch and the finger root wrinkle that are extracted from the palm image for comparison. The finger crotch and the finger root wrinkle are positioned in a root region of a finger. Therefore, the finger crotch and the finger root wrinkle hardly fluctuate even if the opening and closing angle of the finger fluctuates. When the position information is used, the accuracy of the position adjustment is improved. Compared to the finger crotch, the fluctuation of the opening and closing angle of the finger influences on the finger root wrinkle. On the other hand, the fluctuation of the opening and closing angle of the finger hardly influences on the finger crotch. However, when adjacent fingers are closed, the detection accuracy of the winger crotch. In contrast, when the position information of the finger crotch and the finger root wrinkle is used, the accuracy of the position adjustment can be improved. When the accuracy of the position adjustment is improved, the authentication accuracy is improved.

When an asperity shape of the palm outline extracted from the palm image is used, the extraction accuracy of the finger crotch is improved. When the asperity shape of the palm outline extracted from the palm image and the regularity of the palm surface information extracted from the palm image are used, the extraction accuracy of the finger root wrinkle is improved. When an approximated line acquired from the finger crotch and the finger root wrinkle is used, the accuracy of the position adjustment is improved. When a usage ratio of the finger crotch and the finger root wrinkle is changed in accordance with the crotch stability and the wrinkle stability, it is possible to suppress degradation of the accuracy of the position adjustment even if the stability is reduced.

In the embodiment, the position adjustment is performed with use of the position information of the finger crotch and the finger root wrinkle. On the other hand, when the biometric authentication device is downsized, an image capture range of the biometric sensor 105 may be narrowed. And so, the image capture range may be limited so that the finger crotch and the finger root wrinkle are captured. For example, a guide for limiting an input position of a palm to the biometric sensor 105 may be provided so that the finger crotch and the finger root wrinkle are captured.

Figure 17A:
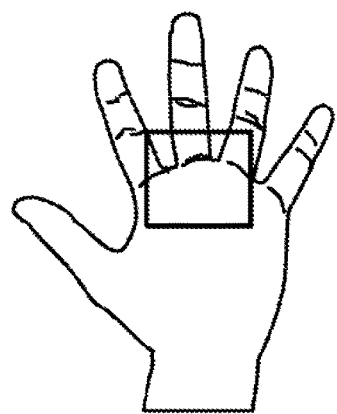
FIG. 17A and FIG. 17B illustrate a partial image.
Figure 17B:
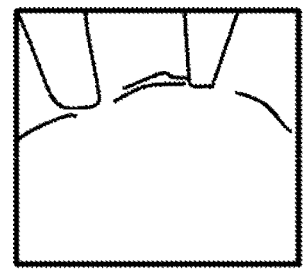

Alternately, a UI (User Interface) shown in the display device 104 may induce the palm so that the finger crotch and the finger root wrinkle are captured. In this manner, it is possible to capture the finger crotch and the finger root wrinkle as illustrated in FIG. 17B, even if a partial image of a whole palm illustrated in FIG. 17A is captured.

In the above-mentioned embodiment, the structure extractor 13 acts as an example of a first extractor configured to extract a finger crotch from a palm image for comparison and a second extractor configured to extract a finger root wrinkle from the palm image for comparison. The position adjuster 19 acts as an example of a position adjuster configured to adjusts at least a position of a biometric feature for comparison of the palm image for comparison and a position of an enrollment biometric feature of an enrolled palm image, based on position information of the finger crotch extracted by the first extractor and position information of the wrinkle extracted by the second extractor. The comparer 20 acts as an example of a comparer configured to compare the biometric feature for comparison and the enrollment biometric feature after position adjustment of the position adjuster. The crotch stability estimator 14 and the wrinkle stability estimator 15 act as an example of a calculator configured to calculate a first variability of each dot structuring the finger crotch extracted by the first extractor and a second variability of each dot structuring the wrinkle extracted by the second extractor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. A biometric authentication device comprising:
   a memory; and
   a processor coupled to the memory and the processor configured to execute a process, the process comprising:
   extracting a finger crotch from a palm image for comparison;
   based on an asperity shape of a palm outline extracted from the palm image and a regularity of palm surface information extracted from the palm image,
   extracting a finger root wrinkle from the palm image for comparison, the surface information being extracted by applying an edge extraction filter;
   adjusting at least one of a position of a biometric feature for comparison of the palm image for comparison and a position of an enrollment biometric feature of an enrolled palm image, based on position information of the finger crotch extracted in the extracting of the finger crotch and position information of the wrinkle extracted in the extracting of the finger root wrinkle; and comparing the biometric feature for comparison and the enrollment biometric feature after the adjusting.

2. The biometric authentication device as claimed in claim 1, wherein in the extracting of the finger crotch, the finger crotch is extracted based on an asperity shape of a palm outline extracted from the palm image.

3. The biometric authentication device as claimed in claim 1, wherein in the adjusting, at least one of the position of the biometric feature for comparison and the position of the enrollment biometric feature is adjusted with use of an approximated line that is acquired from the finger crotch extracted in the extracting of the finger crotch and the wrinkle extracted in the extracting of the finger root wrinkle.

4. The biometric authentication device as claimed in claim 1, wherein:

the process further comprises calculating a first variability of each dot structuring the finger crotch extracted in the extracting of the finger crotch and a second variability of each dot structuring the wrinkle extracted in the extracting of the finger root wrinkle; and in the adjusting, a usage ratio between position information of the finger crotch extracted in the extracting of the finger crotch and position information of the wrinkle extracted in the extracting of the finger root wrinkle is changed in accordance with the first variability and the second variability.

5. A biometric authentication method comprising:

extracting a finger crotch from a palm image for comparison;

based on an asperity shape of a palm outline extracted from the palm image and a regularity of palm surface information extracted from the palm image, extracting a finger root wrinkle from the palm image for comparison, the surface information being extracted by applying an edge extraction filter;

adjusting at least one of a position of a biometric feature for comparison of the palm image for comparison and a position of an enrollment biometric feature of an enrolled palm image, based on position information of the finger crotch extracted in the extracting of the finger crotch and position information of the wrinkle extracted in the extracting of the finger root wrinkle; and comparing the biometric feature for comparison and the enrollment biometric feature after the adjusting.

6. The biometric authentication method as claimed in claim 5, wherein in the extracting of the finger crotch, the finger crotch is extracted based on an asperity shape of a palm outline extracted from the palm image.

7. The biometric authentication method as claimed in claim 5, wherein in the adjusting, at least one of the position of the biometric feature for comparison and the position of the enrollment biometric feature is adjusted with use of an approximated line that is acquired from the finger crotch extracted in the extracting of the finger crotch and the wrinkle extracted in the extracting of the finger root wrinkle.

8. The biometric authentication method as claimed in claim 5, further comprising:

calculating a first variability of each dot structuring the finger crotch extracted in the extracting of the finger crotch and a second variability of each dot structuring the wrinkle extracted in the extracting of the finger root wrinkle, wherein in the adjusting, a usage ratio between position information of the finger crotch extracted in the extracting of the finger crotch and position information of the wrinkle extracted in the extracting of the finger root wrinkle is changed in accordance with the first variability and the second variability.

9. A computer readable, non-transitory medium storing a program that causes a computer to execute a process, the process comprising:

extracting a finger crotch from a palm image for comparison;

based on an asperity shape of a palm outline extracted from the palm image and a regularity of palm surface information extracted from the palm image, extracting a finger root wrinkle from the palm image for comparison, the surface information being extracted by applying an edge extraction filter;

adjusting at least one of a position of a biometric feature for comparison of the palm image for comparison and a position of an enrollment biometric feature of an enrolled palm image, based on position information of the finger crotch extracted in the extracting of the finger crotch and position information of the wrinkle extracted in the extracting of the finger root wrinkle; and comparing the biometric feature for comparison and the enrollment biometric feature after the adjusting.

10. The medium as claimed in claim 9, wherein in the extracting of the finger crotch, the finger crotch is extracted based on an asperity shape of a palm outline extracted from the palm image.

11. The medium as claimed in claim 9, wherein in the adjusting, at least one of the position of the biometric feature for comparison and the position of the enrollment biometric feature is adjusted with use of an approximated line that is acquired from the finger crotch extracted in the extracting of the finger crotch and the wrinkle extracted in the extracting of the finger root wrinkle.

12. The medium as claimed in claim 9, wherein:

the process further comprises calculating a first variability of each dot structuring the finger crotch extracted in the extracting of the finger crotch and a second variability of each dot structuring the wrinkle extracted in the extracting of the finger root wrinkle; and in the adjusting, a usage ratio between position information of the finger crotch extracted in the extracting of the finger crotch and position information of the wrinkle extracted in the extracting of the finger root wrinkle is changed in accordance with the first variability and the second variability.

* * * * *